April 22, 1930. A. R. HUNTER 1,755,397
METHOD AND APPARATUS FOR RETARDING FREELY FALLING MOLD CHARGES
Filed Dec. 7, 1928
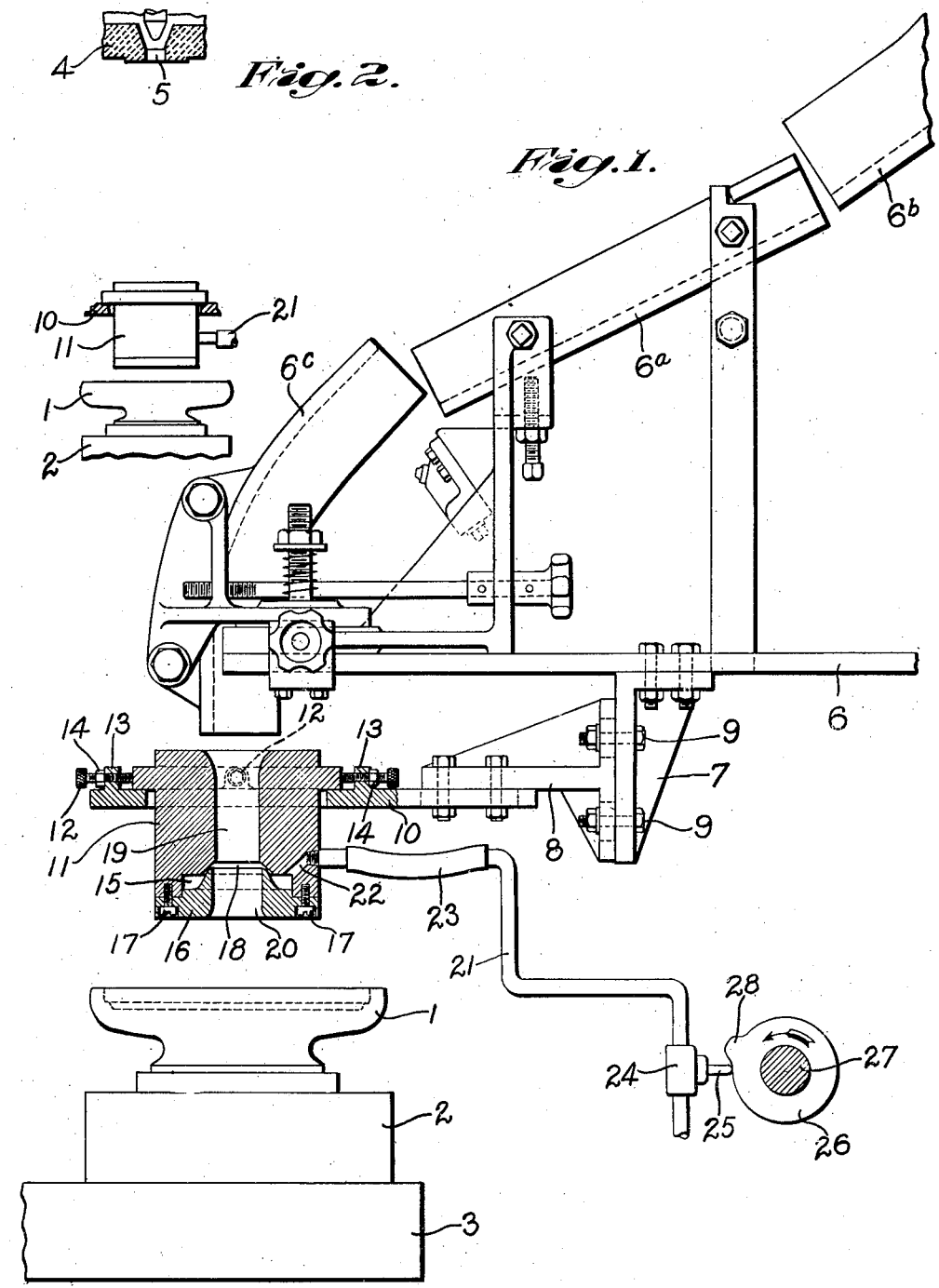
Witness:
Jas. G. White
Inventor
Alfred R. Hunter
by Robert D. Brown
Attorney Patented Apr. 22, 1930

1,755,397

UNITED STATES PATENT OFFICE

ALFRED R. HUNTER, OF HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR RETARDING FREELY-FALLING MOLD CHARGES

Application filed December 7, 1928. Serial No. 324,384.

This invention relates to an apparatus for use in connection with the delivery of molten glass into a mold, and it is particularly useful with molds of the type usable for making flat ware, that is, ware in which the horizontal dimension is greater than the vertical dimension, such for example, as automobile headlight lenses, or plates.

In the usual installation for this and analogous purposes the charges of glass are dropped from an automatic feeder, in some instances by means of chute devices by which they are deflected from a position below the discharge opening of the feeder to some laterally offset position where the molds are located, and in other instances, vertically downwardly into the molds. The vertical distance from the feeder outlet to the level of the molds is often considerable and it has been found that when the charges are dropped into the molds with the velocity which they normally acquire, they are marked to some extent, which may be due to the impression of the grain of material of the mold bottom, or other possible causes. This mark is retained in the finished ware and causes a cloudy appearance to the surface of the glass sometimes known as a "grease spot". By dropping the charge carefully and easily into the mold, the mark is eliminated or at least minimized, and the surface is better and more nearly the natural surface of glass formed out of contact with any substance. To reduce the velocity of the falling charge at the moment of contact with the mold is, therefore, a prime object of my present invention.

It is also desirable and it is a further object of the invention to provide a device in which the shape of the mold charge produced by the usual feeding device is not objectionably altered due to any mechanism or means employed for slowing down the velocity of the mold charge.

A further object of my invention is to provide for adjustment of the charge retarding means in two directions in a horizontal plane, so as to permit it to be properly aligned with any charge guiding devices which may be used.
A further object of my invention is to provide means for adjusting the charge retarding means vertically with respect to the mold, so as to control more definitely the velocity at which the charge drops into the mold by controlling the distance of such drop from the charge retarding means.

Further objects and advantages of the present invention will be apparent from a reading of the following specification and subjoined claims, taken in connection with the accompanying drawings, in which:

Figure 1 represents an elevation partly in section of my preferred form of charge retarding means used in connection with a chute mechanism; and

Fig. 2 is a diagrammatic illustration of the charge retarding means used in connection with a mechanism in which the charge is dropped vertically from the feeder to the mold.

I may accomplish the result desired in retarding the speed of a falling charge by any suitable means for establishing a pressure beneath the charge greater than that above it and all means capable of establishing such a differential pressure respectively above and below the charge as it falls greater than the normal differential of a charge falling through air are within the purview of my invention.

I preferably accomplish this result, however, by the use of a blast of gas which is moving upwardly in a direction generally opposite to that of the falling charge. I may use air for this purpose, or any other gas if desired; and also if desired I may use a hot gaseous medium, so that the heat of the charge is conserved by its being enveloped in a gaseous envelope which is likewise heated. This gaseous envelope surrounding the dropping charge serves also to prevent the charge from contacting with the lateral surfaces of any charge guiding devices through which the charge passes, for example, the funnel or guiding sleeve illustrated in the present instance.

The gas is supplied to the funnel by intermittently operated means, preferably timed from and in relation to the operation of the feeder, and may be supplied in suitable amounts and at suitable pressure to give the desired retarding or stopping effect to the falling charge. The gas may be applied only sufficiently to retard the charges or it may be made to actually stop it. The gas is preferably cut off at such time as to permit the continued movement of the charge to the mold immediately it has been stopped or its velocity retarded to the desired extent.

Referring now to Figure 1 of the drawing, I show a mold at 1 suitable for the manufacture of flat glass articles, such as automobile headlight lenses, by a pressing process. The mold 1 is supported upon a suitable base 2, in turn supported upon a suitable table 3, which may be mounted for rotation as is usual in glass forming machines. The details of the forming machine are not illustrated, however, as they form no part of the present invention.

The charges are preferably supplied by a feeder, such as is indicated in Fig. 2 at 4, of any suitable or desired type, and may be dropped vertically downwardly from the feeder outlet 5 shown in that figure, or may be deflected laterally by a chute mechanism such as is illustrated in Figure 1 and is shown and described in detail as to a similar form in the patent to Ingle, 1,670,770, patented May 22, 1928. This chute mechanism comprises briefly a suitable base or supporting member 6 which supports an adjustable chute member 6ª which is adapted to receive charges from a second chute member 6ᵇ, generally thereabove, and to direct them to a suitable deflector member 6ᶜ, which in turn directs them to a position vertically over the mold from where they are dropped downwardly into the mold. Various adjustments can be made with this charge guiding chute mechanism, but these are not described in detail as they form no part of the present invention and correspond generally to those shown in the Ingle patent.

In the form of the invention shown in Figure 1, I have shown a depending bracket 7 secured to the support 6 and in turn connected with a bracket member 8 which supports the charge retarding devices. Provision is made for vertical adjustment between the brackets 7 and 8 by forming vertically elongate opening in the latter bracket through which pass bolts 9, so that the charge retarding devices hereinafter described may be adjusted vertically with respect to the support 7 and thus with respect to the mold, which is fixed as to its vertical position. Secured to the bracket 8 is a suitable extension or plate 10 in which is mounted a funnel or charge retarding member generally indicated at 11, provision being made in such mounting for adjustment of the charge retarding member 11 in two directions in a horizontal plane, for example, by providing a plurality of adjusting screws 12 extending through suitable bosses 13 which may be integral with the member 10 and bear again a suitable flange secured to or integral with the member 11, suitable jam nuts 14 being provided on the screw 12 for maintaining them in adjusted position.

Within the lower portion of the member 11 is an annular recess 15, which is bounded on its upper side by the under portion or portions of the member 11 and on its lower side by a collar member 16 secured to the member 11 in any suitable manner, as by screws 17. The collar member 16 forms with the under portion of the member 11 an annular nozzle 18 communicating with the recess 15 and directed upwardly through the aperture 19 of member 11, there also being a suitable aperture 20 through the sleeve member 16 in alignment with the aperture 19. While I have shown an annular nozzle for directing the charge retarding fluid upwardly, I contemplate any and all equivalents of this construction, such for example as a series of upwardly directed ports communicating between the central aperture and the annular chamber 15. For the purpose of retarding the charge of molten glass in its downward passage through the guiding member 11, I provide a current of gas, such as air, which is directed upwardly into and through the aperture 19 from the annular nozzle 18. I have shown a pipe 21 communicating with the annular chamber 15 through the passage 22 and connected therewith by a flexible pipe section 23, which permits of the vertical and horizontal adjustment of the charge guiding member 11, this pipe 21 supplying the fluid pressure to the nozzle 18. The supply is preferably controlled by a suitable valve 24 provided with an actuating member 25, which may be spring pressed to closed position in any well known manner and which is designed to be moved to a position in which the valve is open by a cam 26 mounted on a shaft 27, which is timed with the operation of the charge supplying devices, usually the feeder, in any appropriate manner (not shown). While I have shown but a single short protrusion 28 on the cam 26 I do not mean to be limited thereby, but it is to be understood that any suitable design of cam to effect the desired operation of the apparatus may be employed.

In operation, a charge of glass dropping vertically through the aperture 19 of the member 11 will be retarded by an upwardly moving current of gas, issuing from the annular nozzle 18. I prefer in some instances to use hot air or other gas for this purpose, which serves not only to retard the passage of the charge through the guiding member 11, but also to minimize the loss of heat therefrom to the surrounding atmosphere. The use of fluid pressure for retarding the charge also serves to provide an enveloping film of gas surrounding the charge as it falls, which tends to prevent the charge contacting with the side walls of the charge guiding member 11 and thus prevents its objectionable deformation by such contact as well as minimizing its heat loss by conduction of the walls of the guiding member 11.

While I have shown and described but one embodiment of my invention, it is obvious that various changes may be made therein, and I do not wish to be limited, therefore, except by the scope of the appended claims.

I claim as my invention:

1. Apparatus for guiding charges of molten glass into a mold comprising a guiding member having a substantially vertical opening therethrough, means for directing a charge of molten glass downwardly through said opening, and means for causing a differential fluid pressure between the space above said charge and the space below it, in which the pressure in the latter space is the greater, for retarding the speed of said charge in passing through said opening.

2. Apparatus for guiding charges of molten glass into a mold comprising a guiding member having a substantially vertical opening therethrough, means for directing a charge of molten glass downwardly through said opening, and means for causing the development of a superatmospheric pressure in said opening below said charge as it is passing through said opening for retarding its speed.

3. Apparatus for guiding charges of molten glass into a mold comprising a guiding member having a substantially vertical opening therethrough, means for directing a charge of molten glass downwardly through said opening, and means for creating an upwardly moving current of a gaseous medium through said opening for slowing up a freely falling charge of molten glass passing through said opening.

4. Apparatus for guiding charges of molten glass into a mold comprising a guiding member having a substantially vertical opening therethrough, means for directing a charge of molten glass downwardly through said opening, and an annular nozzle formed in said member for directing a compressed gaseous medium upwardly through said opening for retarding the speed of a freely falling charge of molten glass in its passage therethrough.

5. Apparatus for guiding charges of molten glass into a mold comprising a guiding member having a substantially vertical opening therethrough, means for directing a charge of molten glass downwardly through said opening, an annular nozzle formed in said member for directing a blast of compressed air upwardly through said opening for retarding the speed of a freely falling charge of molten glass passing therethrough, and means timed with the supplying of each charge of glass for supplying such blast of air to said nozzle in timed relation to the passage of the charge through said member.

6. Apparatus for guiding charges of molten glass into a mold comprising a guiding member having a substantially vertical opening therethrough, means for directing a charge of molten glass downwardly through said opening, said means and said member being adjustable with respect to each other and both being adjustable with respect to said mold in two directions at right angles to one another in a horizontal plane, and means associated with said member for retarding the speed of a charge of glass passing through said opening.

7. Apparatus for guiding charges of molten glass into a mold comprising a guiding member having a substantially vertical opening therethrough, means for directing a charge of molten glass downwardly through said opening, said means and said member being adjustable with respect to each other in two directions at right angles to one another in a horizontal plane, and means for directing a blast of a gaseous medium upwardly through said opening, whereby to retard the speed of a charge of glass passing downwardly through said opening and simultaneously to minimize the loss of heat from said charge to the walls of said member by creating a fluid film about said charge tending to prevent its contact with said walls.

8. Apparatus for guiding charges of molten glass into a mold comprising a guiding member having a substantially vertical opening therethrough, means for directing a charge of molten glass downwardly through said opening, said means and said member being adjustable with respect to each other in two directions at right angles to one another in a horizontal plane, and means for directing a blast of a gaseous medium upwardly through said opening, whereby to retard the speed of a charge of glass passing downwardly through said opening and to prevent deformation of said charge during such retardation.

9. Apparatus for guiding charges of molten glass into a mold comprising a guiding member having a substantially vertical opening therethrough, means for directing a charge of molten glass downwardly through said opening, said means and said member being adjustable with respect to each other and both being adjustable with respect to said mold in two directions at right angles to one another in a horizontal plane, an annular nozzle formed in the walls of said opening, and means timed with the supplying of the charges of glass for admitting a blast of compressed air to said nozzle, whereby to retard the speed of a charge of glass passing downwardly through said opening while preventing its deformation by contact with solid objects and simultaneously to minimize the loss of heat therefrom to the walls of said opening by creating a fluid film therearound.

10. Apparatus for guiding charges of molten glass into a mold comprising a guiding member having a substantially vertical opening therethrough, means for directing a charge of molten glass downwardly through said opening, a nozzle associated with said opening for directing a current of a hot gaseous medium upwardly therethrough, whereby to retard the speed of a charge of molten glass passing downwardly through said opening and to minimize the heat loss from said charge to the cooler atmosphere or by contact with the walls of said opening.

11. The method of supplying charges of molten glass to a mold which comprises the steps of dropping a charge of glass from a point spaced vertically above the mold, and retarding its falling speed at a point immediately above the mold by the interposition of resilient pressure, while maintaining the charge out of shaping contact with solid objects.

12. The method of supplying charges of molten glass to a mold which comprises the steps of dropping a charge of glass from a point spaced vertically above the mold, and retarding its falling speed at a point immediately above the mold by the interposition of an upwardly moving current of a gaseous medium.

13. The method of supplying formed charges of molten glass to a mold which comprises the steps of dropping a charge of glass from a point spaced vertically above the mold through an annular guiding member positioned immediately above the mold, and simultaneously retarding the falling speed of said charge and preventing its distortion by coming into shaping contact with said member by directing an annular current of a gaseous medium upwardly through the aperture in said annular member.

14. The method of supplying charges of molten glass to a mold which comprises the steps of dropping a charge of glass from a point spaced vertically above the mold, and simultaneously retarding the falling speed of the charge and minimizing its loss of heat to the surroundings by interposing an upwardly moving current of a hot gaseous medium in the path of said charge immediately above said mold.

15. The method of supplying formed charges of molten glass to a mold which comprises the steps of dropping a charge of glass from a point spaced vertically above the mold through an annular guiding member positioned immediately above the mold, and simultaneously retarding the falling speed of said charge, minimizing the loss of heat therefrom to the outer atmosphere and preventing its distortion by coming into shaping contact with said member by directing a current of a hot gaseous medium upwardly through the aperture in said annular member in the path of the charge.

Signed at Hartford, Connecticut, this 3rd day of December, 1928.

ALFRED R. HUNTER.